United States Patent [19]
Krauter

[11] Patent Number: 4,759,893
[45] Date of Patent: Jul. 26, 1988

[54] METHOD OF MAKING FIBRE-REINFORCED PLASTIC MOLDED PARTS

[76] Inventor: Manfred Krauter, Holzwiesenweg 7, 7062 Rudersberg-Steinenberg, Fed. Rep. of Germany

[21] Appl. No.: 713,651

[22] Filed: Mar. 19, 1985

[30] Foreign Application Priority Data

Mar. 19, 1984 [DE] Fed. Rep. of Germany ....... 3410050

[51] Int. Cl.⁴ .............................................. B29C 43/10
[52] U.S. Cl. .................................... 264/258; 264/314; 425/812
[58] Field of Search ............... 264/257, 267, 274, 314, 264/315, 258, 273, 102; 425/405 R, 812

[56] References Cited

U.S. PATENT DOCUMENTS

| | | | | |
|---|---|---|---|---|
| 1,952,468 | 3/1934 | Smith | | 156/209 |
| 2,109,558 | 3/1938 | Waters | | 264/273 |
| 2,420,522 | 5/1947 | Le Grand Daly | | 156/211 |
| 2,581,652 | 1/1952 | Goss | | 425/812 |
| 2,894,855 | 7/1959 | Wilhelm et al. | | 264/273 |
| 2,913,036 | 11/1959 | Smith | | 264/102 |
| 2,945,262 | 7/1960 | Petty | | 264/257 |
| 2,977,269 | 3/1961 | Nerwick | | 264/102 |
| 3,050,780 | 8/1962 | Pollit | | 264/257 |
| 3,135,640 | 6/1964 | Kepka et al. | | 156/147 |
| 4,311,661 | 1/1982 | Palmer | | 264/510 |
| 4,379,103 | 4/1983 | Doerfling | | 425/812 |
| 4,562,033 | 12/1985 | Johnson et al. | | 264/510 |

FOREIGN PATENT DOCUMENTS 2100662  1/1983  United Kingdom .

*Primary Examiner*—James Lowe
*Attorney, Agent, or Firm*—Foley & Lardner, Schwartz, Jeffery, Schwaab, Mack, Blumenthal & Evans

[57] ABSTRACT

The invention is directed to a method of making fibrereinforced plastic moulded parts, in which fibrous material such as glass fibre material is placed in a mould and a liquid synthetic composition is pressed into the fibrous material with the aid of a pressure bag. In order to avoid air bubbles and defects not provided with synthetic composition, the invention provides for a widemeshed net to be placed either onto or between the fibrous material. During pressing, this net will promote escape of the air entrapped in the fibrous material.

10 Claims, 3 Drawing Sheets

METHOD OF MAKING FIBRE-REINFORCED PLASTIC MOLDED PARTS

BACKGROUND OF THE INVENTION

The invention is directed to a method of making fibrereinforced plastic molded parts.

When making fiber reinforced plastic molded parts it has proven advantageous to have a large proportion of fibers with a view to the obtainable strength of the parts. To this end a cold press molding method has been developed in which the fibrous material, after impregnation with resin, is subjected to high pressure in a press until the resin is cured, so that the resin will be squeezed out to a large extent. With this method the fiber content cannot be increased to more than about 35%. Above all, it is impossible with this method to make moulded parts including undercuts.

The U.S. Pat. No. 3,050,780 discloses a method by means of which fiber reinforced molded parts with undercuts may be made. Glass fiber material is placed in a hollow mould, thereupon a plastic composition is applied to the inside of the glass fiber material and is pressed into the same by means of a pressure bag so as to be distributed in the glass fiber material. When the plastic composition is cured, the pressure is removed from the pressure bag and the bag is withdrawn from the thus formed hollow body. In this way it is possible to produce hollow articles with undercuts. It is a drawback of this known method that the plastic composition will not be evenly distributed in the glass fiber material when the pressure bag is inflated. When being inflated, the pressure bag contacts the glass fiber material on all sides and compresses the same, so that the air entrapped in the glass fiber material can hardly escape, and for the synthetic resin the flow resistance in the glass fiber material also increases to such an extent that the resin is distributed only with difficulties. Consequently, the parts produced with this method cannot be made without defects but contain a large number of air bubbles or of locations to which no synthetic resin has penetrated. For this reason the known method cannot be used, for instance, to produce safety helmets, which are subject to stringent requirements in respect of safety and strength, as is the case for instance with motorcycle safety helmets. Therefore, the known method also has not been used for such safety helmets; the commercially available safety helmets have so far been produced as hand lay-up laminates with a high resin content, and they are therefore heavy and entail high material costs.

The known method according to the prior art (U.S. Pat. No. 3,050,780) has the further drawback that pressure build-up in the mold cannot be properly controlled, so that due to uneven pressure inside the mold the molded parts made therein also exhibit defects in which the glass fiber material has not been completely wetted by the synthetic resin composition.

SUMMARY OF THE INVENTION

It is therefore the object of the invention to improve the methods according to the prior art in such a way that the plastic composition may uniformly flow into the entire fibrous material, and that the formation of air bubbles or defects is prevented. Furthermore a method is to be provided with which it is possible to control the pressure build-up during compression of the resinimpregnated material and to make the squeezing operation uniform throughout all portions of the mold.

In accordance with the invention a wide-meshed net is placed on the glass fiber material and is co-embedded in the resin composition during the molding process. In particular, this wide-meshed net is placed between two layers of fibrous material. Normally, the fibrous material consists of strands or bundles of microscopically fine spun fibers. The wide-meshed net acts as a drainage layer for the air which is entrapped in the fibrous material and which has to escape when the resin composition is compressed. Due to the wide-meshed structure corresponding small voids will form therein, into which the air entrapped in the fibrous material may enter during the pressing operation. The air escapes along the surfaces of the net to the outside and permits the flow of resin composition to follow it without the formation of air bubbles. Preferably, the mesh size of the net is about 1 mm and more. In contrast to the fabric or braiding of fibrous material, the filaments of the net are not spun from individual fibers but from solid monofil material, so that they do not absorb any resin. "Net" within the meaning of the present invention is any wide-meshed braiding of such filaments. It is immaterial whether the filaments are tied to each other or welded. Preferably, the diameter of the single filaments or veins of the net is greater than that of the fiber bundles or threads to which the fibrous material has been spun or twisted; however, it may also be equal to the diameter of such bundles or strands of fibers, since it is mainly required that the mesh structure of the net should leave open small hollow spaces into which air may flow and along which it may be discharged to the outside. Preferably the filaments of the net have a smooth surface to minimize flow resistance to the subsequent flow of resin.

Preferably, the material of the net is elastic and stretchable under tension. This offers the particular advantage that the net is stretched somewhat when the resin composition is compressed by means of the pressure bag, whereby wrinkling of the net is prevented. It is also possible in dependency on the shape of the molded article to use a material which cannot be stretched, such as a wire screen (fly screen).

When the mold has curved surfaces the net is cut in single pieces which may be matched to the mold, so that creases and wrinkles will not be formed when the flat net is pressed to the inner wall of the mold or the pressure bag.

The nature and compressibility of the net material should be selected such that during the pressing operation with the pressure bag the resin-impregnated fiber bundles should be squeezed and deformed much more easily than the venting net, which is required to form the air collecting spaces. Preferably, the net is made of polyamide, polycarbonate or polyethylene. The method according to the invention is particularly suitable for producing hollow articles with undercuts, such as concave members for motorcycle safety helmets or for hulls, for instance for kayaks. It is a further advantage of this method that special formed portions such as grooves, bulges etc. can easily be made, since the pressure bag exactly fits the corresponding contours of the mold.

It is also possible with the method according to the invention to manufacture sandwich parts, in which e.g. molded PVC boards or foamed boards are additionally placed intermediate the various layers of fibrous material.

Preferably, the pressure bag is configured in such a way that when being inflated it will initially engage the inner wall of the mold in those areas remote from the portions of the fibrous material which protrude from the mold. To this end the pressure bag in its unpressurized state is somewhat closer to the bottom portion of the inner wall covered with fibrous material than to the upper portion, so that upon inflation of the pressure bag the material will slowly be urged upwards from the bottom. The air is then easily vented to the rim of the mold and thence to the outside.

Preferably, the net is placed intermediate two layers of glass fiber material, since in that case the air may flow from both sides into the air collecting spaces formed by the braiding when the resin composition is compressed.

BRIEF DESCRIPTION OF THE DRAWINGS

Below, the process will be described in detail with reference to the embodiments illustrated in the drawings in which.

DETAILED DESCRIPTION OF THE PREFERRED EMBODIMENTS

Figure 1:
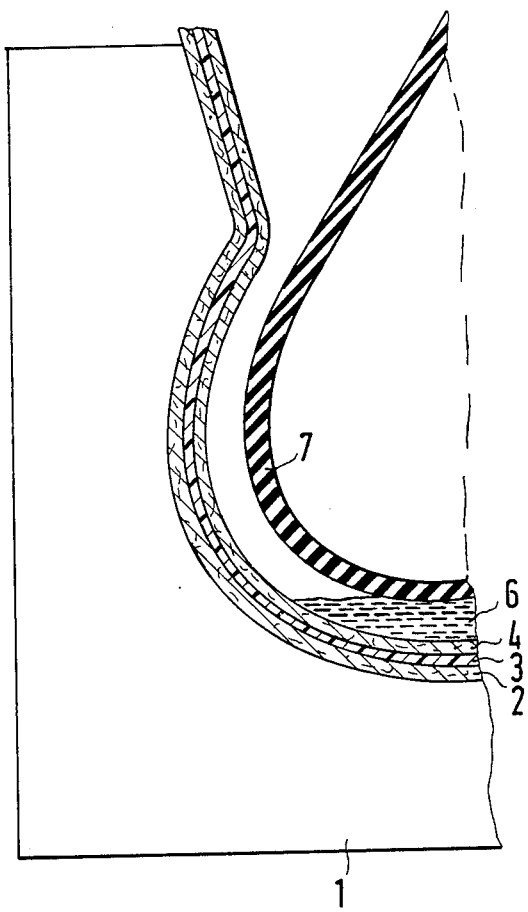
FIG. 1 illustrates the basic concept of the invention.

FIG. 1 is a fragmentary view of a hollow mold 1 which in the illustrated example may be used to produce the shell of a safety helmet. A first textile glass mat 2 is placed on the inner wall of the mold. Thereupon a wide-meshed net 3 is placed on said textile glass mat 2, and a glass fiber material, for instance a glass fiber fabric 4, is in turn placed on said net 3. Subsequently, liquid synthetic resin 6 is introduced. Thereupon the pressure bag 7 is inflated. It urges the liquid synthetic resin 6 into the glass fiber material 4 and the textile glass mat 2. Any air present in either the fabric 4 or the mat 2 will escape into the cavities formed by the wide-meshed net 3 and flow along the "drainage layer" provided by the net 3 to the outside. Following curing of the synthetic resin, the pressure is removed from the pressure bag 7, the bag is withdrawn from the cavity, and the molded part is removed from the mould 1.

Figure 2:
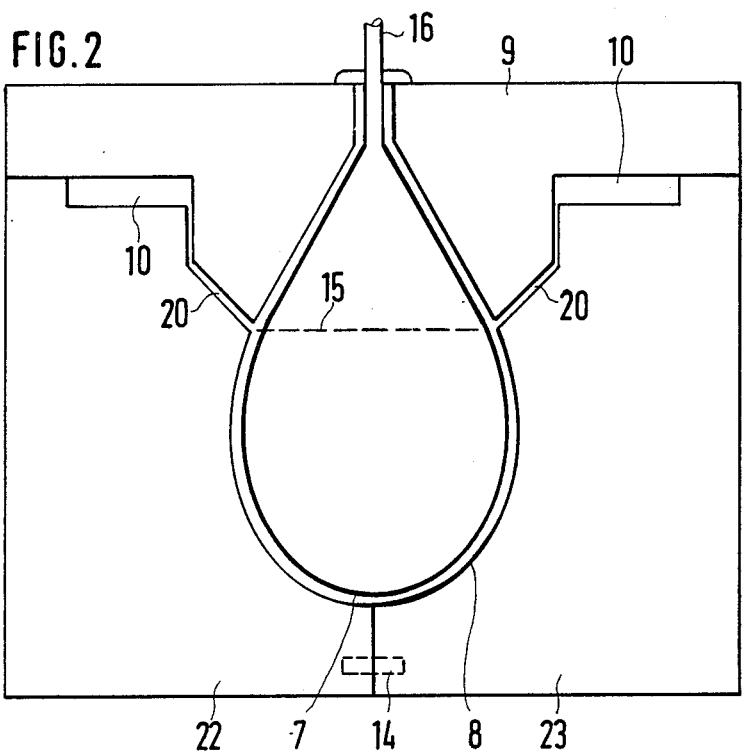
FIG. 2 illustrates the apparatus employed for carrying out the process of the invention.

FIG. 2 illustrates schematically the apparatus employed to carry out the process. The bottom half of the mold may be separated into two half-shells 22, 23, and the two half-shells are provided with guide means 14 for assembly in a snug fit. These two half-shells 22, 23 enclose an undercut hollow space whose inner wall 8 corresponds to the shape of the article to be molded. A tooling contour indicated by the dashed line 15 in FIG. 2 is provided in the half-shells.

Above the tooling contour 15, gaps 20 extend outwardly and are bent upwards at their outer ends to terminate in an overflow 10. It is also possible to provide a continuous gap which corresponds to the shape of the upper closure member 9.

A conduit 16 passes through the upper member 9 and has the pressure bag 7 attached to the lower end thereof. Pressurized medium may flow through the conduit 16 into the pressure bag 7 to inflate the same so that it will be urged against the inner wall 8 of the mold.

Figure 3:
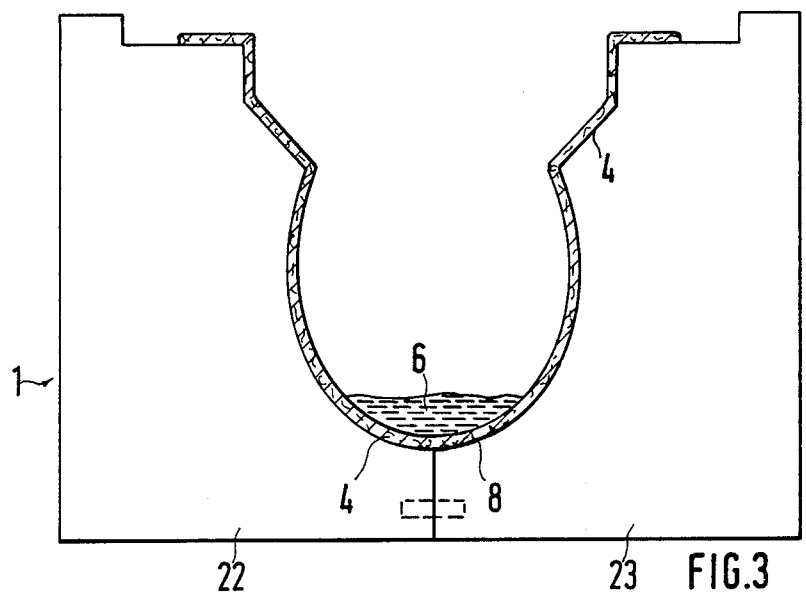
FIG. 3.
Figure 4:
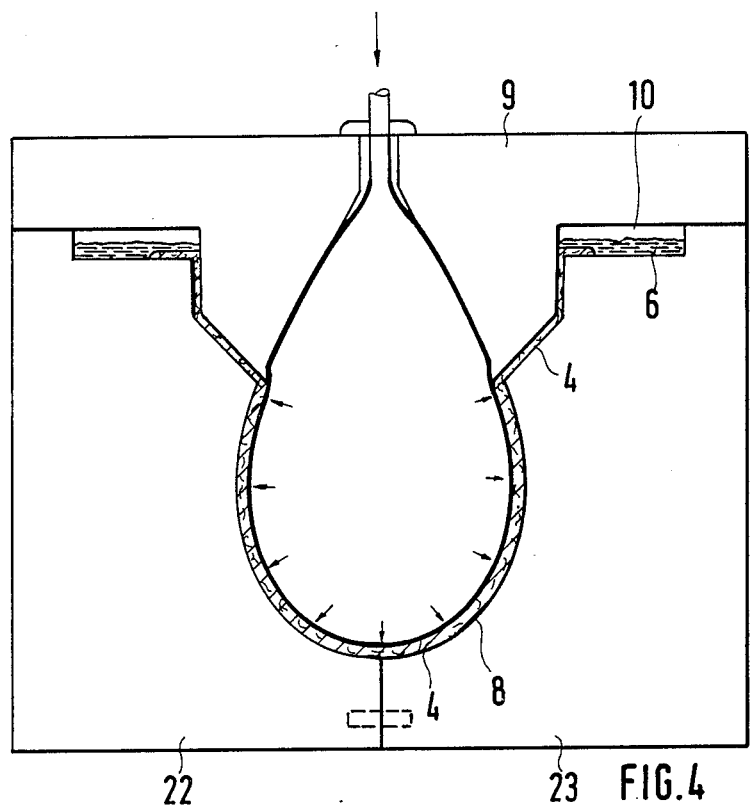
FIG. 4 illustrate schematically the stages of the process according to the invention.

In FIGS. 3 and 4 the process is schematically illustrated. The fibrous material 4, for instance a textile glass mat, is placed on the inner wall 8 of the mold 1 and is extended along the gaps 20 up to the overflow 10. Thereupon a liquid curable plastics composition 6 is charged onto the fibrous material 4. Now, the pressure bag is introduced.

Subsequently, the upper member 9 is placed in position, and the pressure bag is inflated through the conduit 16. The pressure bag 7 is configured such that it will initially engage the inner wall 8 of the mold at those locations which are most remote from the gaps 20. Then, the synthetic resin composition 6 is pressed by the pressure bag along the shape of the shell right to the continuous gap 20 and exits downstream of the gap into the overflow 10. After curing of the synthetic resin composition the pressure medium is removed from the pressure bag 7, the closure member 9 is lifted off, and the lower half of the mold is separated into the two half-shells 22, 23. The finished part may now be removed from the mold.

Figure 5:
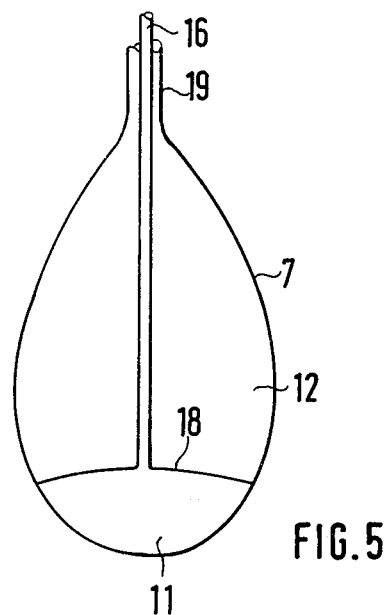
FIG. 5 is a schematic view of a special embodiment of the pressure bag used to carry out the process.

FIG. 5 shows schematically a special embodiment of a pressure bag, with which it is possible to initially expand the pressure bag at the location farthest from the gaps 20, i.e., on the bottom of the inner wall 8 of the mold in FIG. 4, to slowly urge the liquid synthetic resin through the fibrous material and upwards into the overflow. To this end the pressure bag comprises two chambers 11, 12 separated from one another by a diaphragm 18. The bottom pressure chamber 11 is supplied with pressurized medium through an inner conduit 16, and the outer pressure chamber 12 is supplied with pressurized medium through the outer conduit 19. First the pressure chamber 11 and subsequently the outer pressure chamber 12 will be supplied with pressurized medium. The build-up of pressure is controlled so that the pressure chamber 11 operates at a higher pressure than the outer pressure chamber 12.

I claim:

1. A method of making a fiber-reinforced plastic molded article in which air bubbles have been removed and synthetic composition is distributed uniformly throughout, comprising the steps of:
   (a) providing a mold and positioning a layer of fibrous material adjacent the inner wall of the mold, said mold having a closed end and an opposite end through which material can be positioned in the mold, said mold when closed having gaps at said opposite end through which air and excess material can be removed from the article being formed;
   (b) positioning a net over said fibrous material, said net being of wide mesh relative to said fibrous material and non-absorbing of plastic composition during the molding process;
   (c) positioning a second layer of fibrous material over said net, said net during the molding operation providing a drainage layer to receive and permit the flow of trapped air from said fibrous layers during the molding operation;
   (d) introducing a liquid flowable synthetic composition into said mold in contact with said second layer of fibrous material adjacent the closed end of the mold;
   (e) positioning an expandable pressure bag within and spaced from the second layer, uniformly pressing said flowable synthetic composition into said fibrous layers by expanding said pressure bag by introducing a pressurized medium thereto, said bag initially engaging said fibrous layers and net adjacent the closed end of the mold, such pressing resulting in the composition replacing air in said fibrous layers, said replaced air escaping into said drainage layer provided by said net and flowing therefrom outwardly of the molded article at the opposite end of said mold, with said composition progressively flowing through said second layer into said net, said net being thereby embedded in said composition; and (f) curing said synthetic composition thereby to provide an article in which air bubbles do not appear and said composition is distributed evenly throughout.

2. A method as claimed in claim 1, wherein said net is comprised of filaments which have a smooth surface.

3. A method as claimed in claim 1, wherein said net has a mesh size in excess of 1 mm.

4. A method as claimed in claim 2, wherein the diameter of the filaments of the net is equal to or larger than the diameter of a bundle of fibrous material comprising said layers.

5. A method as claimed in claim 4, wherein the diameter of the filaments of the net is larger than approximately 0.2 mm.

6. A method as claimed in claim 1, wherein said net is elastic extensible.

7. A method as claimed in claim 1, wherein said net is a braiding of polyamide, polyethylene, polycarbonate or metal.

8. A method as claimed in claim 1, wherein the fibrous material extends outwardly of the mold into said gaps, said mold being closed by means of a matching closure member, and wherein an excess amount of the synthetic composition charged into said mold is urged along said gaps into an overflow during said pressing step.

9. A method as claimed in claim 1, wherein the pressure in said pressure bag is maintained at a first pressure level during a first period of time of said pressing step and thereafter is maintained at a second pressure level during a second period of time of said pressure step, said second pressure being higher than said first pressure.

10. A method as claimed in claim 1, wherein said pressure bag includes two or more pressure chambers, and wherein predetermined pressures are applied to said pressure chambers at a predetermined time sequence.

* * * * *